(No Model.) 2 Sheets—Sheet 1.
G. W. COFRAN.
MACHINE FOR MOLDING OPENINGS IN PLUMBERS' SLABS.
No. 585,024. Patented June 22, 1897.
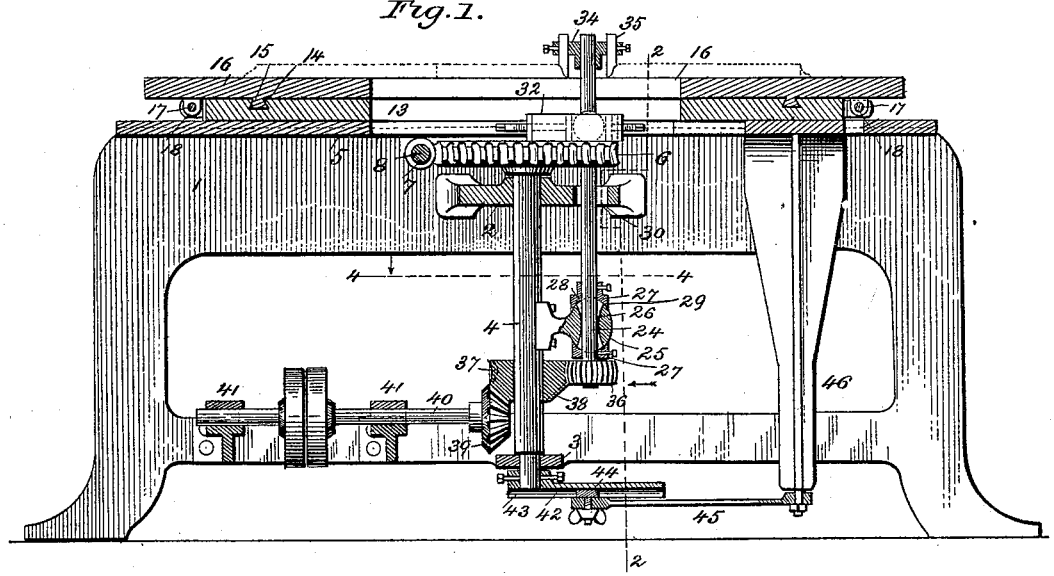
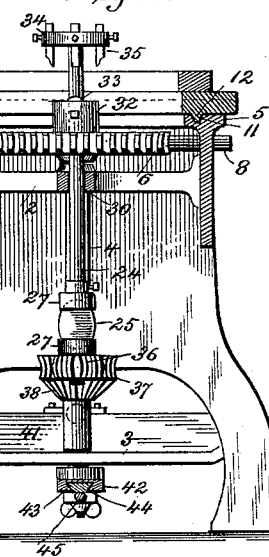
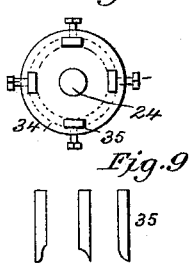
WITNESSES
J. E. Luckett
Jos. A. Ryan
INVENTOR
George W. Cofran
BY
Fred G. Dieterich
ATTORNEY.
THE NORRIS PETERS CO., PHOTO-LITHO., WASHINGTON, D. C.

(No Model.) 2 Sheets—Sheet 2.
G. W. COFRAN.
MACHINE FOR MOLDING OPENINGS IN PLUMBERS' SLABS.
No. 585,024. Patented June 22, 1897.
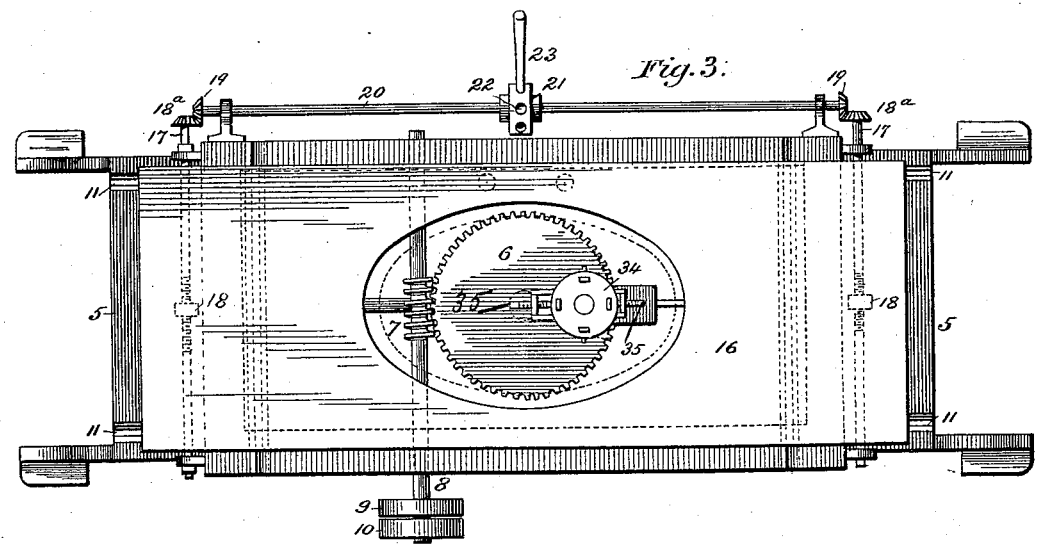
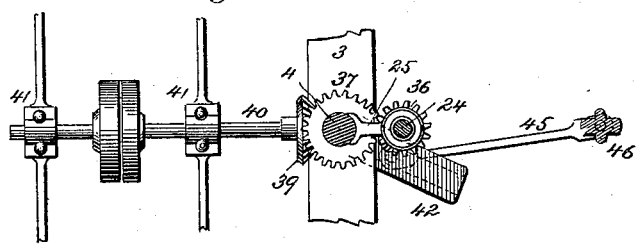
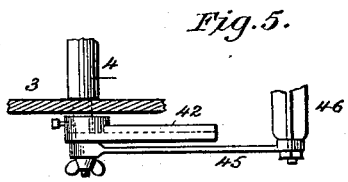
WITNESSES:
J. E. Luckett
Jos. A. Ryan
INVENTOR
George W. Cofran
BY
Fred G. Dieterich
ATTORNEY.

UNITED STATES PATENT OFFICE.

GEORGE W. COFRAN, OF BALTIMORE, MARYLAND, ASSIGNOR TO L. HILGARTNER & SONS, OF SAME PLACE.

MACHINE FOR MOLDING OPENINGS IN PLUMBERS' SLABS.

SPECIFICATION forming part of Letters Patent No. 585,024, dated June 22, 1897.

Application filed November 24, 1896. Serial No. 613,309. (No model.)

*To all whom it may concern:*

Be it known that I, GEORGE W. COFRAN, residing at Baltimore, in the State of Maryland, have invented a new and Improved Machine for Molding Openings in Plumbers' Slabs, of which the following is a specification.

My invention primarily has for its object to provide a machine for forming the ogee or other shaped molding on the circular and oval openings in plumbers' stone slabs for washstands and the like, of a simple and economical construction, which can be easily manipulated, and which will effectually operate for its intended purposes.

With other objects in view, which will hereinafter be specified, my invention consists in a machine for the purposes described embodying the peculiar combination and novel construction of parts, such as will be first described in detail, and then be specifically pointed out in the appended claims, reference being had to the accompanying drawings, in which—

Figure 1 is a longitudinal section of my improvement. Fig. 2 is a transverse section thereof, taken practically on the line 2 2 of Fig. 1. Fig. 3 is a plan view of the same. Fig. 4 is a detail horizontal section on the line 4 4 of Fig. 1. Fig. 5 illustrates the reciprocator or link-arm connecting the main shaft with the pendent arm of the work-table or slide-carriage set to hold the said slide-carriage from movement. Fig. 6 is an enlarged detail view of the worm-wheel and the journal-box for adjustably supporting the upper end of the cutter-shaft. Fig. 7 is a detail section on the line 7 7 of Fig. 6. Fig. 8 is a plan view of the cutter-holder, and Fig. 9 illustrates several forms of the cutters.

To attain the several objects for which my machine is constructed, the same comprises a main drive-shaft, a cutter-head axially rotatable about such main shaft and adjustably connected therewith, radially, whereby to increase or diminish the circular path or travel of the cutters to cut the edges of the openings of a greater or less circumference, such cutter-head having a separate means for imparting a rapid rotation to the cutter-head shaft, and a work-table or carriage movable in a right line to combine the movement of the cutter-head with the rectilinear movement of the carriage, having adjustable connections with the main drive-shaft, whereby such movement is automatically effected and the travel of the said carriage is regulated relatively to the extent of the elongation of the opening in the slab.

The essential feature of my invention lies in the arrangement and combination of the slowly-rotatable main or worm-wheel shaft, the adjustable cutter-carrier secured to such shaft to move in a circle with the same, the sliding table or carriage and the means for imparting a rectilinear movement thereto, operated by the rotation of the main shaft, and a hand-operated crosswise-movable bed portion for holding the slab to the cutters.

Referring now to the drawings, in which like numerals indicate like parts in all the figures, 1 indicates the main frame, provided at the upper end with a transverse bearing member 2 and at the lower end with a similar member 3, held in alinement with the member 2, as clearly shown in Fig. 1.

4 indicates the main shaft, which is journaled vertically in the bearing members 2 and 3. The upper end of the shaft 4 terminates just under the bed or top 5 of the frame 1 and carries a worm-gear 6, with which meshes the worm 7 on the power-shaft 8, disposed transversely of the frame and provided with fast and loose pulleys 9 and 10.

The top or bed 5 has a pair of longitudinal grooves 11, in which fit tongues 12 on the bottom of the longitudinally-sliding table or carriage 13, which at the ends has transverse dovetail grooves 14 to receive the tongues 15 of a second or upper table or carriage 16, on which the slab to be molded is held, such carriage being held to traverse the under table or carriage crosswise, so as to hold the slab up to the cutters, and such movement of the table 16 may be effected in any well-known manner—such, for instance, as shown in Fig. 3, in which 17 indicates transverse screw-shafts journaled in bearings on the ends of the lower carriage and held to engage threaded sockets 18 on the carriage 16, the outer ends of the said shaft 17 having bevel-gears $18^a$ $18^a$, held to mesh with similar gears 19 19 on a longitudinally-disposed shaft 20, also carried by the lower carriage, which shaft 20 has a disk 21, having peripheral sockets 22 to receive a hand-lever 23, whereby the said shaft may be turned to move the upper carriage as the operator may desire.

24 indicates the cutter-carrier shaft, the lower end of which is journaled in a bearing 25, fixedly connected to the main shaft, such bearing having its shaft-passage formed with convexed bearing-faces 26 to provide a free bearing for the said shaft 24 when such shaft is adjusted radially to or from the axis of the drive-shaft 4, for the purpose presently described. To facilitate such free bearing for such shaft and to hold same in proper position thereon, washers or collars 27 are secured to such shaft, having concaved bearing portions 28 to engage the convexed ends 29 of the bearing-bracket, as clearly shown in Fig. 1.

The shaft 24 is guided in an elongated slot 30 in the upper bearing member 2 and passes through an elongated slot 31 in the worm-wheel (see Fig. 6) and through an adjustable boxing 32, fixedly held on top of the worm-wheel, the shaft having an apertured ball 33, which forms a ball-bearing in the boxing 32 and serves to render the rotation of the said shaft 24 free under all its different adjustments.

The top of the frame and the upper and lower carriages have central openings of suitable size, through which the upper end of the cutter-shaft extends, which end carries the cutter-holder 34, which may be of any approved construction and detachably connected thereto, the cutters 35 being also detachably secured to the holder, as shown in Fig. 8.

So far as described it will be readily apparent that by connecting the cutter-head shaft to the main drive-shaft in the manner stated the same will be moved with the worm-wheel, the center of which is the axis about which the cutter-carrier rotates, the radius of the circle being readily increased or diminished as the size of the circle or narrowest diameter of the opening in the slab may make necessary by adjusting the screws of the shaft-boxing on the worm-wheel.

The lower end of the cutter-carrier shaft has a gear-wheel 36, having convex teeth, which is held to mesh with a gear-wheel 37, having concave teeth loosely mounted on the drive-shaft and which has a bevel-gear portion 38, which meshes with a bevel-gear 39 on the drive-shaft 40, journaled on the transverse member 41 41 of the frame, such shaft having loose and fast pulleys, as shown.

By providing operative gearing arranged in the manner shown and described provision is made for imparting a high speed of rotation to the cutter-shaft, which is essential to produce the results desired, while the cutter-carrier is slowly carried around in a circle with the worm-gear, a slow speed being necessary for the circle of movement of the carrier to enable the cutters to do their work and the operator to properly adjust the transversely-movable carrier.

By referring now more particularly to Fig. 1 it will be seen that on the lower end of the main or drive shaft 4 is secured a crank-arm 42, having a dovetail groove 43 its length, in which is adjustably held a slide-block 44, to which is pivotally connected one end of the connecting-rod 45, the other end of which is pivotally connected to a pendent arm 46, secured to the longitudinally-reciprocating slide-carriage.

By connecting the slide-carriage to the main drive-shaft, as shown and described, the movement of such carriage is made automatic and the speed thereof regulated in accordance with the sweep or circle of travel of the cutters. Furthermore, should the opening in the slab be a slightly-elongated one, the rod 45 would be connected to the crank-arm 43 accordingly nearer the axis of the drive-shaft 4, or should the oval opening be an extended one the connection of such rod to the crank-arm would be relatively nearer the outer end.

Should the opening in the slab be a circle, the rod would be joined to the crank-arm at the axial point of the drive-shaft. Such connection, it is manifest, would tend to hold the said rod from reciprocal movement and in consequence hold the slide-carriage stationary.

From the foregoing, taken in connection with the drawings, it is thought the complete operation and advantages of my invention will readily appear. The same comprises very few parts, a single drive-shaft being employed for imparting circular motion to the cutter-carrier and for automatically feeding the slab lengthwise to a degree proportionate to the character of the size of oval opening. Furthermore, such shaft also forms a bearing for the intermediate gear which imparts a rapid movement to the cutter-carrier shaft.

The several operating parts are all under the bed of the frame and are so disposed and connected that they can be readily adjusted to an operative condition.

In a machine of this kind to obtain the best results it is necessary that the cutters rotate rapidly to cut the slab and the circle movement be of a slow nature, so that the slab, especially when an oval opening is to be molded, can be properly fed up to the cutters.

Were the rotation of the cutters and the circle movement thereof at a uniform speed, in case of a slow movement of the worm-wheel the cutters would not operate quick enough to cut the mold. In case of a high speed of the cutters the circle movement would be too rapid to allow the cutters to remain in engagement with any one point of the opening in the slab to produce a finished cutting thereof.

Manifestly changes in form and details of parts may be made from those shown and specified without departing from the scope of the appended claims.

Having thus described my invention, what I claim, and desire to secure by Letters Patent, is—

1. The combination of a drive-shaft, a worm-gear secured to the upper end thereof, said gear having a radially-adjustable journal-box, and the shaft a fixed radially-projecting bearing, a cutter-carrier shaft journaled in the adjustable journal-box and the fixed bearing, whereby it is carried around the axis of the said shaft as such shaft is rotated, means for imparting a slow rotation to the said worm-gear and shaft, a cutter-carrier having a drive-gear at its lower end, a gear loosely held on the worm-gear shaft, held to engage the cutter-carrier-shaft gear, and means for driving such loose gear substantially as shown and described.

2. The combination with a main drive-shaft, means for imparting a slow rotary motion thereto, a worm-wheel on the upper end of the shaft having a bearing member, a bearing connected to the lower end of the said shaft, and the cutter-carrying shaft journaled in such bearings, means for imparting a rapid rotation to such shaft as it is carried around with the main shaft, a reciprocating work-table, having a pendent member, and intermediate connections joining such pendent member and the main drive-shaft, reciprocally movable by the rotation of such drive-shaft as specified.

3. The combination with the main drive-shaft, the cutter-carrier shaft supported directly thereon and movable in a circle therewith, and means for imparting a slow movement to the said main shaft, of a sliding work-table having a pendent member, a connecting-rod pivotally joined to the lower end thereof, a crank member secured to the drive-shaft, a sliding member adjustably secured thereon, said connecting-rod having a pivotal connection with such sliding member, and means for imparting a rapid rotation to the cutter-carrier shaft as the same is rotated about the axis of the main shaft as specified.

4. The combination with the main drive-shaft having a worm-gear at the upper end, and a bearing-box having convex bearing-faces at the lower end, said gear having an adjustable bearing-box, and means for operating the worm-gear, of the cutter-carrier shaft, journaled in the convex bearing-box and in the adjustable bearing-box, said shaft having a drive-gear 36 at the lower end, the drive-shaft 40 having gear 39, the double gear 37 38 loosely mounted on the main drive-shaft, held to mesh with the gears 39 and 36, and means for moving the slab longitudinally and transversely to the cutter substantially as shown and described.

GEORGE W. COFRAN.

Witnesses:
L. H. DAPPRICH,
W. H. WILBUR.